(12) United States Patent
Kahn et al.

(10) Patent No.: US 7,839,279 B2
(45) Date of Patent: Nov. 23, 2010

(54) MONITOR, ALERT, CONTROL, AND SHARE (MACS) SYSTEM

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 361 days.

(21) Appl. No.: 11/192,549

(22) Filed: Jul. 29, 2005

(65) Prior Publication Data

US 2007/0024441 A1 Feb. 1, 2007

(51) Int. Cl.
*G08B 1/08* (2006.01)
*G07C 11/00* (2006.01)

(52) U.S. Cl. ............... 340/539.22; 340/539.12; 340/286.02

(58) Field of Classification Search .............. None
See application file for complete search history.

(56) References Cited

U.S. PATENT DOCUMENTS

| | | | |
|---|---|---|---|
| 5,737,439 A | 4/1998 | Lapsley et al. | |
| 5,771,001 A | 6/1998 | Cobb | |
| 5,960,085 A | 9/1999 | de la Huerga | |
| 6,408,330 B1 | 6/2002 | de la Huerga | |
| 6,595,929 B2 | 7/2003 | Stivoric et al. | |
| 6,788,980 B1 | 9/2004 | Johnson | |
| 7,155,507 B2 | 12/2006 | Hirano et al. | |
| 7,379,999 B1 | 5/2008 | Zhou et al. | |
| 7,457,872 B2 | 11/2008 | Aton et al. | |
| 7,664,657 B1 * | 2/2010 | Letzt et al. ............... | 705/2 |
| 2002/0138017 A1 | 9/2002 | Bui et al. | |
| 2003/0101260 A1 | 5/2003 | Dacier et al. | |
| 2003/0139908 A1 | 7/2003 | Wegerich et al. | |
| 2003/0149526 A1 | 8/2003 | Zhou et al. | |
| 2003/0208113 A1 | 11/2003 | Mault et al. | |
| 2003/0227487 A1 | 12/2003 | Hugh | |
| 2003/0236625 A1 | 12/2003 | Brown et al. | |
| 2004/0017300 A1 | 1/2004 | Kotzin et al. | |
| 2004/0024846 A1 | 2/2004 | Randall et al. | |
| 2004/0043760 A1 * | 3/2004 | Rosenfeld et al. ......... | 455/414.3 |
| 2004/0044493 A1 | 3/2004 | Coulthard | |
| 2004/0078219 A1 | 4/2004 | Kaylor et al. | |
| 2004/0078220 A1 | 4/2004 | Jackson | |

(Continued)

FOREIGN PATENT DOCUMENTS

WO WO 02/088926 A1 11/2002

OTHER PUBLICATIONS

PCT Notification Preliminary Report on Patentability, PCT/US2006/29570, mailing date: Feb. 7, 2008, 6 pages.

(Continued)

*Primary Examiner*—Julie Lieu
(74) *Attorney, Agent, or Firm*—Blakely, Sokoloff, Taylor & Zafman, LLP; Judith A. Szepesi

(57) ABSTRACT

An apparatus to provide an always-on monitor, alert, control, and share (MACS) device comprising a connection to receive intermittent updates from a real sensor device, the always-on virtual MACS device corresponding to the real sensor device, and a presentation layer to enable a user to interface with the always-on virtual MACS device, the always-on virtual MACS device providing data regardless of the status of the real sensor device.

19 Claims, 7 Drawing Sheets

U.S. PATENT DOCUMENTS

| | | |
|---|---|---|
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0148392 A1 | 7/2004 | Cotte |
| 2004/0259494 A1 | 12/2004 | Mazar |
| 2005/0027567 A1 | 2/2005 | Taha |
| 2005/0038691 A1 | 2/2005 | Babu |
| 2005/0079873 A1 | 4/2005 | Caspi et al. |
| 2005/0101841 A9 | 5/2005 | Kaylor et al. |
| 2005/0102167 A1* | 5/2005 | Kapoor .......................... 705/3 |
| 2005/0107944 A1 | 5/2005 | Hovestadt et al. |
| 2005/0113650 A1 | 5/2005 | Pacione et al. |
| 2005/0131736 A1 | 6/2005 | Nelson et al. |
| 2005/0146431 A1* | 7/2005 | Hastings et al. ........ 340/539.12 |
| 2005/0182824 A1 | 8/2005 | Cotte |
| 2005/0235058 A1 | 10/2005 | Rackus et al. |
| 2005/0256414 A1 | 11/2005 | Kettunen et al. |
| 2005/0262237 A1 | 11/2005 | Fulton et al. |
| 2006/0109113 A1* | 5/2006 | Reyes et al. .................. 340/541 |
| 2006/0154642 A1* | 7/2006 | Scannell .................. 455/404.1 |
| 2006/0161459 A9* | 7/2006 | Rosenfeld et al. .............. 705/3 |
| 2006/0249683 A1 | 11/2006 | Goldberg et al. |
| 2007/0017136 A1 | 1/2007 | Mosher, Jr. et al. |
| 2007/0024441 A1 | 2/2007 | Kahn et al. |
| 2007/0050157 A1* | 3/2007 | Kahn et al. .................... 702/55 |
| 2007/0192483 A1* | 8/2007 | Rezvani et al. .............. 709/224 |
| 2007/0239399 A1 | 10/2007 | Sheynblat et al. |
| 2009/0099668 A1* | 4/2009 | Lehman et al. ................ 700/80 |

OTHER PUBLICATIONS

PCT International Search Report and the Written Opinion of the International Searching Authority, PCT/US2006/29570, 7 pages.

* cited by examiner

MONITOR, ALERT, CONTROL, AND SHARE (MACS) SYSTEM

FIELD OF THE INVENTION

The present invention relates to virtual sensors, and in particular to a virtual device that permits monitoring, alerting, controlling and/or sharing based on sensor data.

BACKGROUND

Electrical sensors, monitors, and devices built by an ever-changing group of manufacturers are constantly entering the market. Collectively, these devices will be referred to as SMDs (sensors, monitors, devices).

Users are increasingly looking to bring access to all of these SMDs to their daily routine. In the prior art, this remote access has been limited to historical information access such as databases or e-mails, while other SMD data is not remotely accessible.

In the prior art, SMDs were only intermittently connected to users. Communication between users and devices was fragmented by these intermittent connections such that users could not reliably obtain and manipulate SMD content.

SUMMARY OF THE INVENTION

An apparatus to provide an always-on monitor, alert, control, and share (MACS) device comprising a connection to receive intermittent updates from a real sensor device, the always-on virtual MACS device corresponding to the real sensor device, and a presentation layer to enable a user to interface with the always-on virtual MACS device, the always-on virtual MACS device providing data regardless of a status of the real sensor device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a virtual managing, accessing, controlling, and sharing (MACS) device. The MACS device is a virtual representation of a real sensor, monitor, or device (SMD) which is intermittently coupled to the server, or other device, supporting the MACS device. The SMD transmits intermittently. However, the MACS device offers a continuous always-on connection, enabling constant monitoring. In one embodiment, the MACS device also enables the use of alerts, in various ways. For example, alerts may be triggered based on variance from historical data, or other information that a standard SMD does not store. The MACS device, in one embodiment, enables a user to control the actual SMD at any time. Of course, the actual SMD will only be changed at the next opportunity when the intermittent connection is updated. In one embodiment, the MACS device further enables the sharing of the SMD data, in a secure manner.

Figure 1:
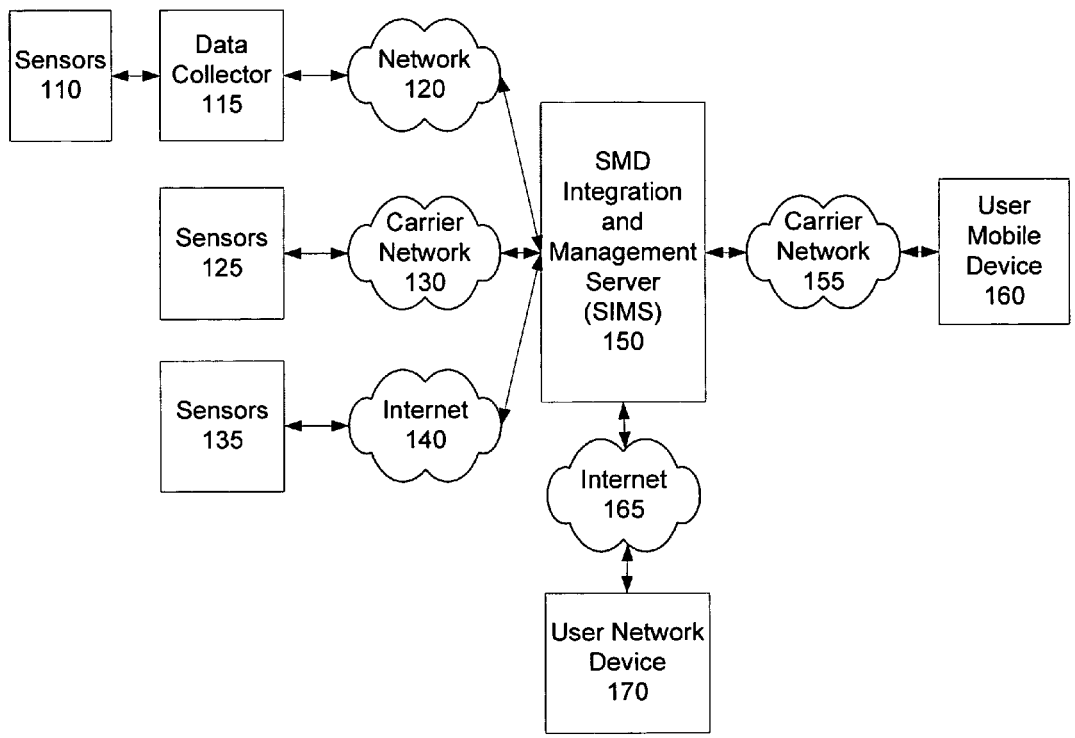
FIG. 1 is a network diagram of one embodiment of the various elements of the system.

FIG. 1 is a network diagram of one embodiment of the various elements of the system. The various SMDs 110 are coupled through various means to the SMD Integration and Management Server (SIMS) 150. They may be coupled direct, as shown for SMD 125, coupled through carrier network 130, or SMD 135 coupled through the Internet 140, or they may be coupled through a data collector 115, which accumulates data from sensor 110, and sends it through network 120 to SIMS 150.

SIMS 150 contains the MACS device (not shown). The MACS device is then accessible via the Internet 165, carrier network 155, or some other means to various user devices 160, 170.

Figure 2:
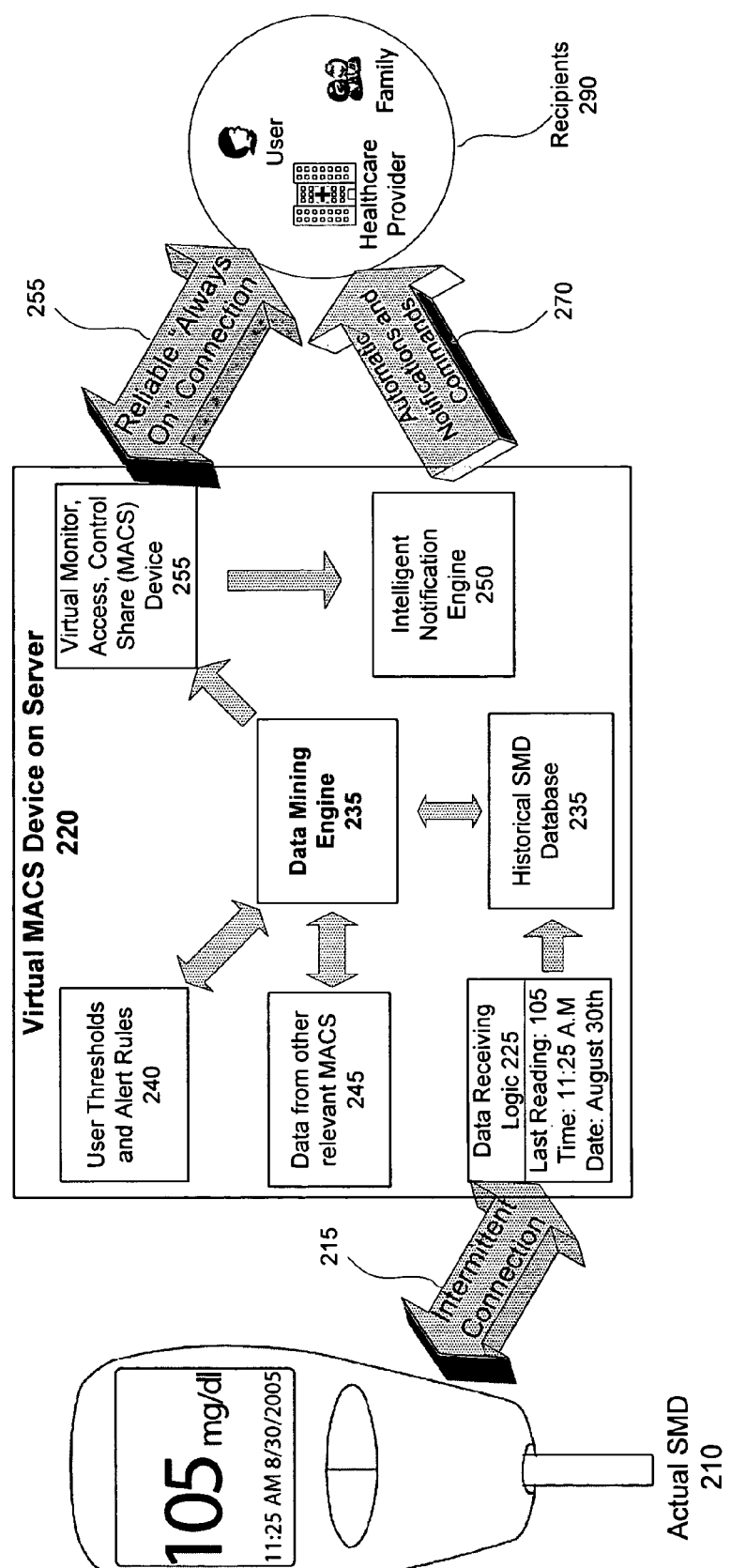
FIG. 2 is a block diagram illustrating one embodiment of the MACS device and its relationship to the actual SMD.

FIG. 2 is a block diagram illustrating one embodiment of the MACS device and its relationship to the actual SMD. The actual SMD 210 has an intermittent connection 215 to a server 220. The connection 215 may be through the Internet, through a carrier network, or through other means. The server 220 may be located in the same location as the real SMD 210.

The data receiving logic 225 receives the data from the actual SMD 210 via an intermittent connection 215. The data is stored in historical database 230. The historical data is used by data mining engine 235, to present virtual MACS device 255 via a reliable always-on connection 265 to various recipients 290. In a healthcare setting for example, the recipients may include the user, healthcare providers, and family. For environmental monitors, the recipients may include the responsible local and state officials, local residents, or other relevant recipients.

In one embodiment, data mining engine 235 may further interface with user alerts and rules 240 to generate notifications through intelligent notification engine 250. Intelligent notification engine 250 can send automatic notifications to designated recipients 290, when certain threshold or alert conditions are met. The threshold or alert conditions may include historical data, trend analysis, variance from charted trends, simple threshold, or any combination of the use of historical and current data from the actual SMD 210. In one embodiment, the data mining engine 235 constantly monitors the database 230, to ensure that the alert rules and user thresholds 240 have not been triggered. Intelligent notification engine 250 can, in one embodiment, trigger a notification in an appropriate format to any designated recipient.

In one embodiment, in addition to the database 230, data from other relevant actual SMDs may be received as well via logic 245. For example, in an environmental situation, in addition to the wind speed, the barometric pressure, or other relevant conditions may be monitored. The threshold and alert rules 240 may utilize a combination of data from more than one real SMD to trigger a notification or command 270.

Figure 3:
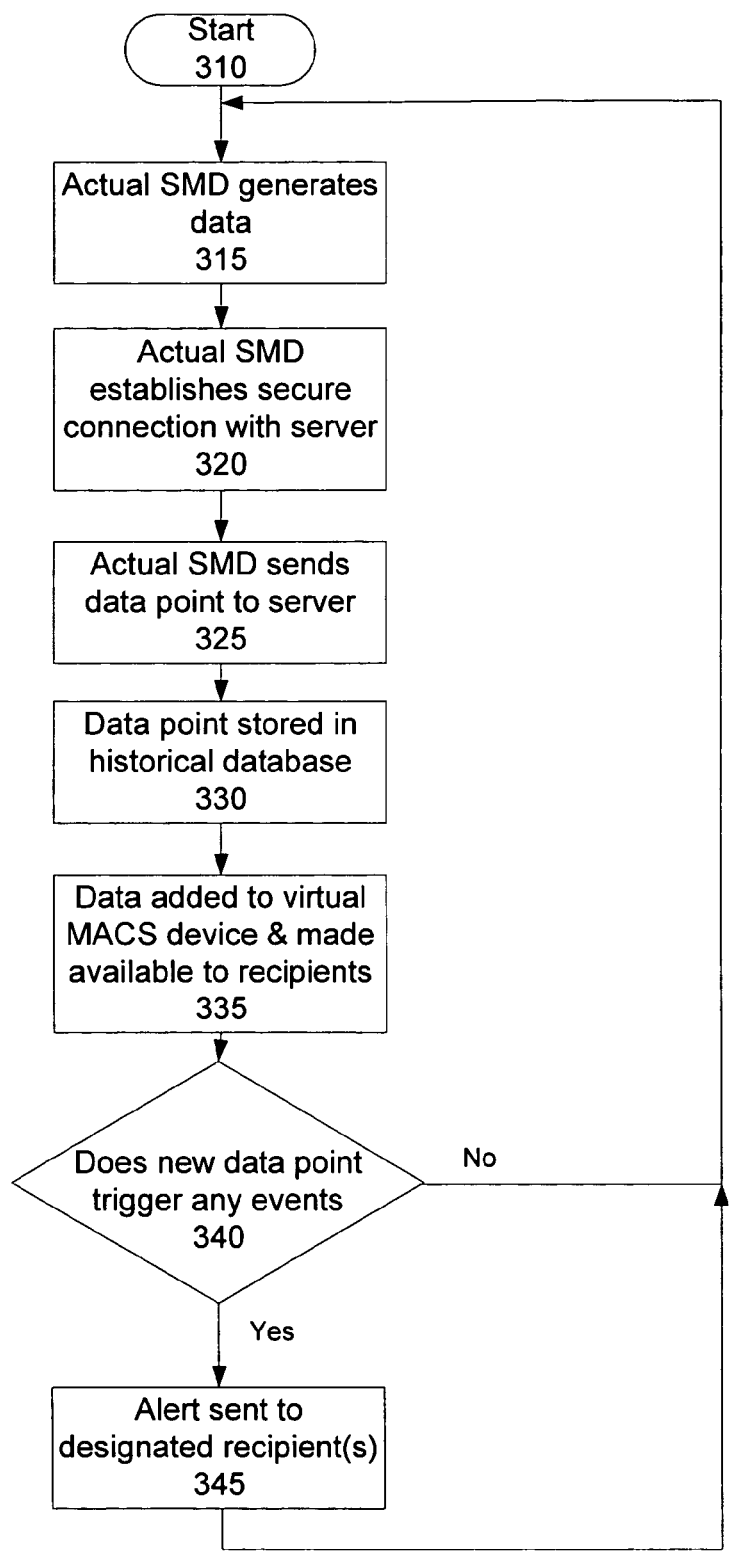
FIG. 3 is a flowchart of one embodiment of receiving data from the real sensor device, and integrating it into the virtual MACS device.

FIG. 3 is a flowchart of one embodiment of receiving data from the real sensor device, and integrating it into the virtual MACS device. The process starts at block 310. At block 315, the actual SMD generates data. In one embodiment, this occurs periodically. Alternatively, it may be triggered by an action of the user, or a change in conditions.

At block 320, the SMD establishes a secure connection with the server. The actual SMD, in this context, includes any auxiliary devices that may be used in communicating with the server. U.S. patent application Ser. No. 11/173,753, filed Jun. 30, 2005, and assigned to the same assignee describes some of the methods that the SMD may use to establish such a connection. The data is sent to the server, at block 325.

At block 330, the data is stored in the historical SMD database. This database, in one embodiment, stores all historical data available for the SMD. In one embodiment, the historical database may include historical data for a particular period, for example for the past month. In another embodiment, the historical database may purge some of the data over time. For example, in one embodiment, the historical database may include only daily average data for records older than one year, while it includes variance range data for records older than six months. Alternative data retention policies may be implemented by historical SMD data database.

At block 335, the data is added to the virtual MACS device, and made available to recipients. Recipients see an always-on connection, which is updated whenever new data is available from the actual SMD.

At block 340, the process determines whether the new data point triggers any events. In one embodiment, this may be done using complex calculations including historical data, data from other SMDs, etc. If an event is triggered, at block 345, the alert(s) are sent to the designated recipient(s) associated with the triggered event(s). Note that a single data point may trigger multiple alerts, and that each alert may have different responses. In one embodiment, alert responses may range from notification of the user, notification of an appropriate third party, or notification of a government official to triggering an actual action by the SMD. For example, if the SMD is a blood sugar monitor, the alert may range from alerting the user to eat something, alerting the ambulance, to automatically injecting insulin or sugar into the user's bloodstream. The process then returns to block 315. Note that while these processes are described using flowcharts, in actuality the implementation may be interrupt driven. In one embodiment, each data connection with an actual SMD may trigger a separate thread on the server, to perform these functions.

Figure 4:
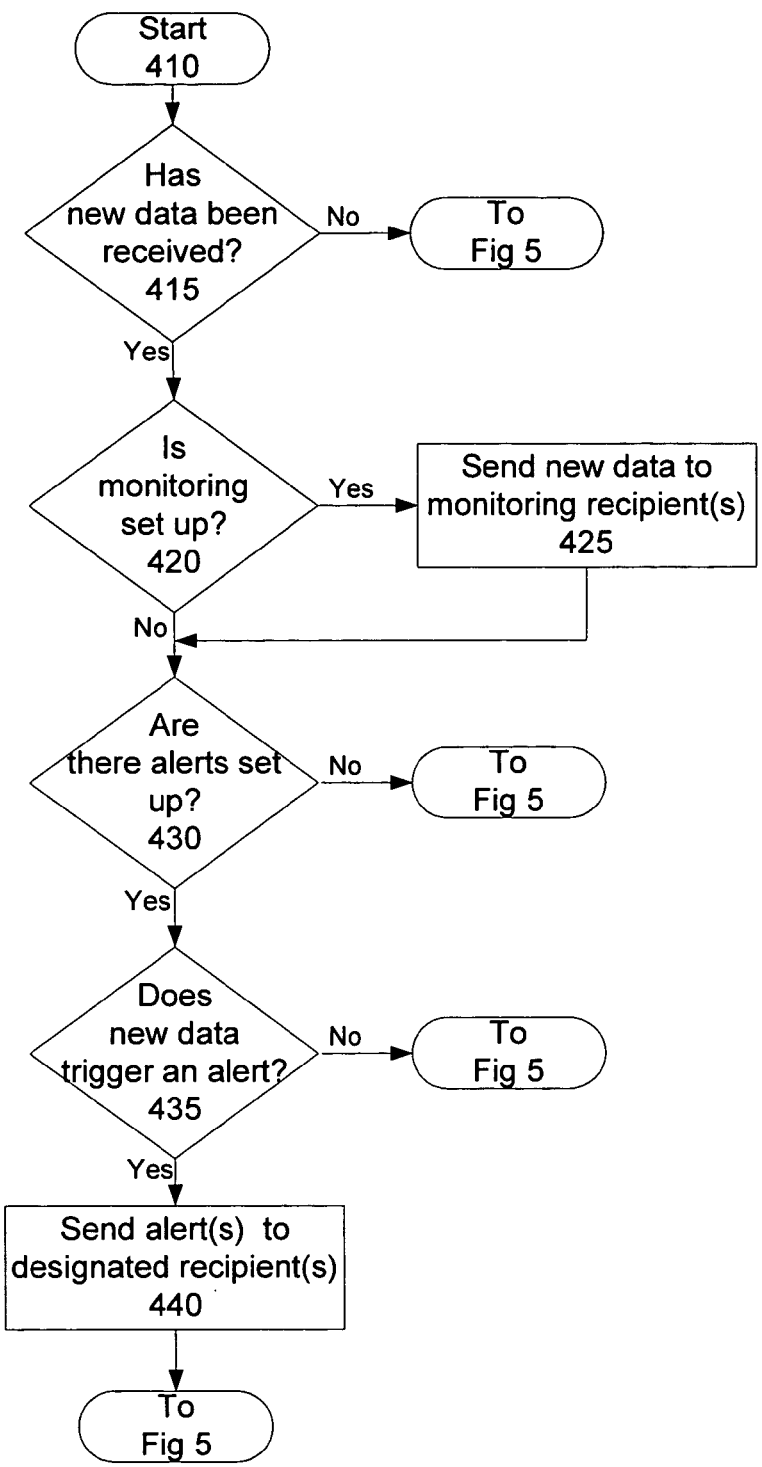
FIG. 4 is a flowchart of one embodiment of the monitor and alert features of the virtual MACS device.

FIG. 4 is a flowchart of one embodiment of the monitor and alert features of the virtual MACS device. The process starts at block 410. At block 415, the process determines if new data has been received. If no new data has been received, the process continues to FIG. 5, discussed below.

If new data has been received, from an actual SMD, the process continues to block 420. At block 420, the process determines whether monitoring has been set up. Monitoring enables an administrator (user with certain rights) to set up an automatic monitor. If monitoring is set up, at block 425, the data is sent to the monitoring recipients. The process then continues to block 430. If there is no monitoring, the process continues directly to block 430.

At block 430, the process determines if there are any alerts set up. If no alerts have been set up, the process continues to FIG. 5, described below.

If one or more alerts have been set up, at block 435, the process determines whether the new data triggers one or more alerts. Note that the "new data" may actually include the new data point integrated with historical data, and integrated with data from other SMDs if appropriate. If the new data does not trigger an alert, the process continues to FIG. 5.

If an alert is triggered, the process, at block 440, sends an alert to the designated recipients. The alert, in one embodiment, may be a visual, auditory, tactile or other alert. In one embodiment, the alert may include the relevant data that triggered the alert. In one embodiment, the alert may be a URL, which when followed provides secure access to the relevant data on the server. In one embodiment, the alert may be an SMS message, Internet Instant message, a voicemail or any other type of notification which may be used to provide information. The process then continues to FIG. 5.

Figure 5:
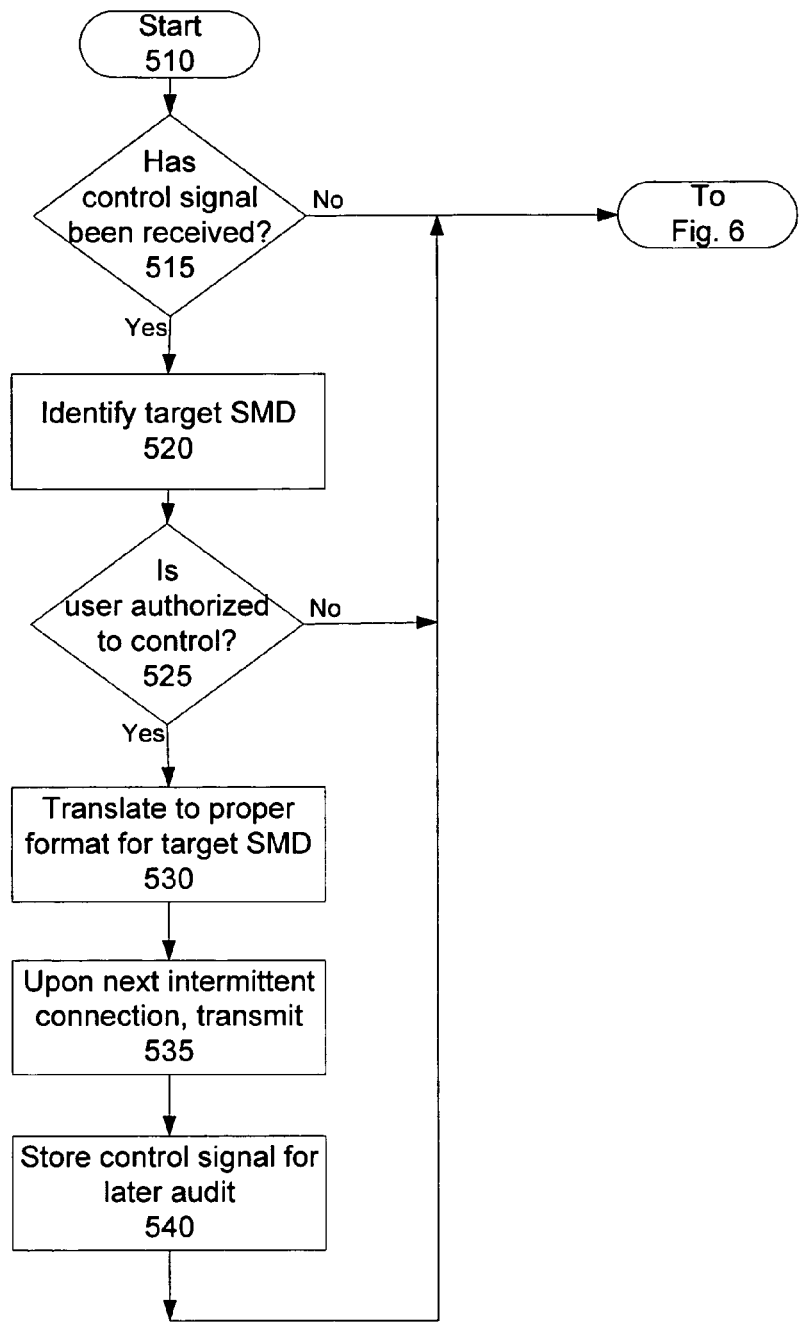
FIG. 5 is a flowchart of one embodiment of the control feature of the virtual MACS device.

FIG. 5 is a flowchart of one embodiment of the control feature of the virtual MACS device. The process starts at block 510. At block 515, the process determines whether a control signal has been received. If no control signal has been received, the process continues to FIG. 6, described below.

If a control signal has been received, the process continues to block 520. At block 520, the process identifies the target SMD. In one embodiment, the control request includes a target SMD identification. In one embodiment, each actual SMD may have a unique identifier, which enables a request to be targeted. In one embodiment, the user selects the actual SMD based on a list of available SMDs. In one embodiment, this list of available SMDs is restricted to those SMDs that the user has access to.

At block 525, the process determines whether the user is authorized to send the control signal to the selected SMD. In one embodiment, users may have various levels of control and access to the virtual MACS and actual SMD. For example, a patient may be able to access all data, but may not be able to change the settings on certain medical alerts related to his or her condition.

Figure 6:
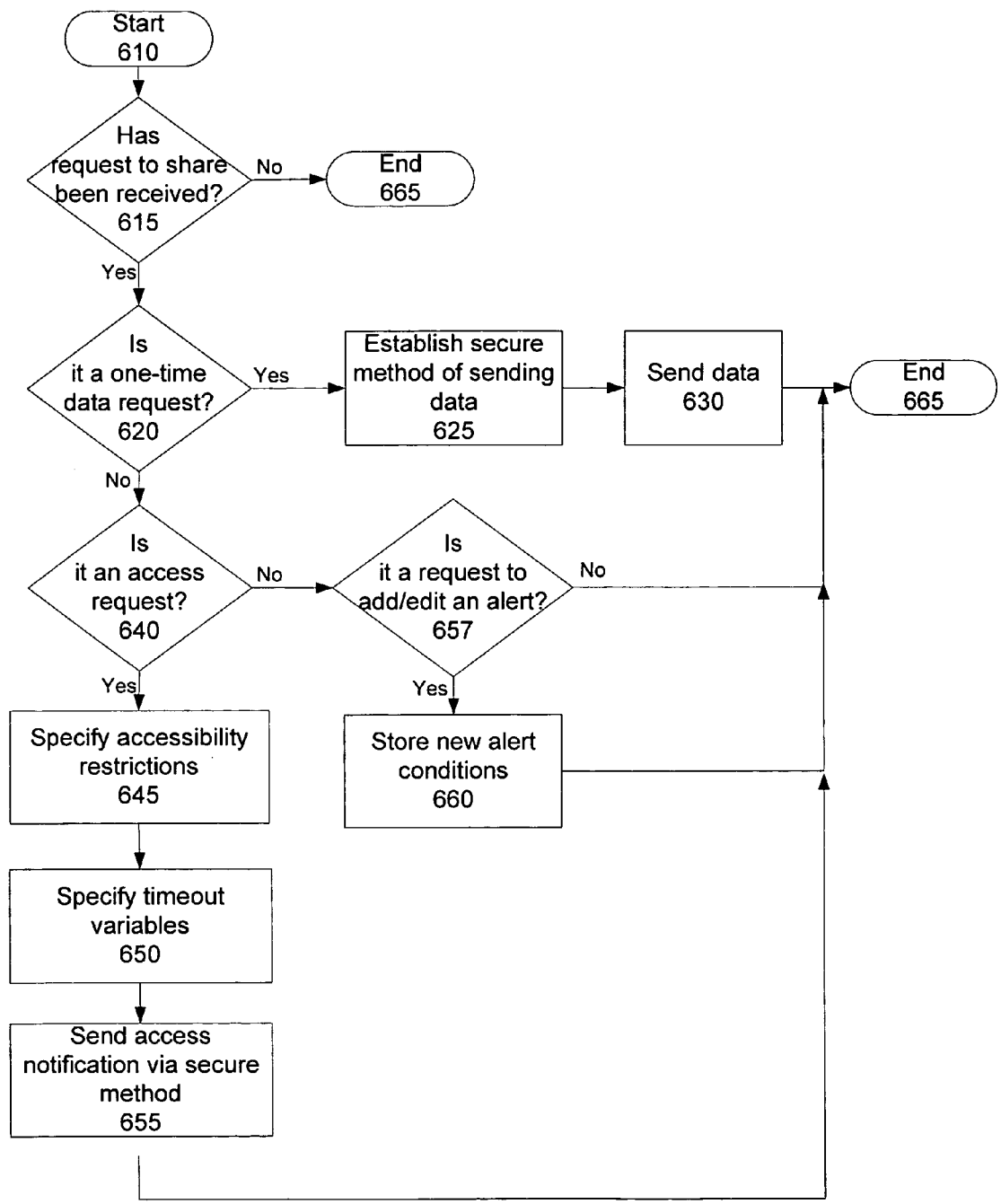
FIG. 6 is a flowchart of one embodiment of the sharing feature of the virtual MACS device.

If the user is not authorized, this process ends, and the process continues to FIG. 6. In an alternative embodiment, when the user initially attempts to create a control signal, the system only makes those commands and controls available that the user is authorized to use. In that instance, in one embodiment, this step may be skipped. In one embodiment, an integral step, even prior to the identification of the target SMD, is authentication of the user. In one embodiment, security is a high priority, and all communications are conducted over authenticated and secure channels.

If the user is authorized to control the selected SMD, the process at block 530 translates the control signal to the appropriate format for the target SMD. Each type of SMD may have particular control signals and commands. The user may, in one embodiment, enter the control signal in a universal language, regardless of the target SMDs actual control language. The translation means that the user need not understand the specific requirements and specifications of the actual SMD.

At block 535, upon the next intermittent connection to the actual SMD, the translated command is transmitted.

At block 540, the control signal is stored. In general, these commands change the activities of the SMD. By storing these controls, and the user associated with them, it is possible to audit the processes of the actual SMD, and verify each change in activity. In one embodiment, the SMD may return an "acknowledgement" which is then filed along with the control signal. In one embodiment, an alert may be triggered by the control signal that was sent. For example, in a health setting, if the patient changes certain settings of the SMD, the doctor that prescribed the SMD use may be alerted.

The process then continues to FIG. 6.

FIG. 6 is a flowchart of one embodiment of the sharing feature of the virtual MACS device. The process starts at block 610. At block 615, the process determines whether a request to share has been received. Requests to share are originated by a currently authorized user. If no request to share has been received, the process ends at block 665. If a request has been received, the process continues to block 620.

At block 620, the process determines if this is a one-time data request. For example, a share request may simply indicate that a particular data point or set of data points should be sent to an identified user or group of users. If the data request is a one-time request, the process continues to block 625.

At block 625, the process determines a secure method of sending data. In one embodiment, if the recipient is a member of the system, the process simply sends an alert, indicating that new data is available using the known method of contacting that recipient. If the recipient is outside the system, various methods of transferring the data may be used. In one embodiment, data has an associated "security rating" and this rating determines how it is sent out. Certain data, which is low rated, can simply be sent to a known email address. Other data may require encryption, a password, or some other form of authentication.

The data is sent 630 once a secure method is established. In one embodiment, the secure method may require a data exchange between the recipient and the server. For example, the server may send an initial "click here to establish your bona fides to access this data." The recipient may then need to log into a web site, or otherwise establish his or her identity before the server sends the data. After the data is successfully sent, the process ends at block 665.

If this is not a one-time data request, the process continues to block 640. At block 640, the process determines whether this is an access request. An access requests adds a user to the list of recipients who can access the virtual MACS device. If this is not an access request, the process continues to block 660.

In one embodiment, the only types of sharing requests are one-time data requests, access requests, additional alert requests or alert modifications. Therefore, if the request is neither a one-time data request nor an access request, then it is a new alert or an alert modification. In another embodiment, if other types of sharing methods may be used, the process may be adjusted, as would be understood by one of skill in the art.

If a new alert condition has been entered as the share request as determined in block 657, the process at block 660 stores the new alert condition. Note that, in one embodiment, each alert condition may have one or more recipients attached to it. The new alert condition may simply be the addition of a recipient to an existing alert condition. In one embodiment, when the alert is triggered, the "one-time data request" procedure described above is followed. When the new alert condition is stored, the process continues to block 665, and ends.

If the share request was an access request, as determined at block 640, the process continues to block 645.

At block 645, the accessibility restrictions are specified. Access restrictions specify what the user can do. The virtual MACS device permits monitoring, alerting, controlling, and sharing. The user who creates the share request specifies what level of access the newly added data recipient will have. In one embodiment, the user cannot share a higher level of access than his or her own. In one embodiment, each user, in addition to his or her own access level, also has an "access granting level" which defines the level of access that the user may grant. As noted above, this level may range from simply being able to monitor, to being able to control, add new alerts, and invite others to share the data. In one embodiment, the user may specify the accessibility restrictions. In one embodiment, there is a system default. In one embodiment, the system default is to enable monitoring only. Of course, alternative system defaults may be used.

At block 650, the time-out variables are specified. The time-out variables indicate until what time this sharing will be in effect. In one embodiment, the time-out may be "never" or may be specified by any period. In one embodiment the time-out period may be one or more of the following: length of time, number of data points, number of log-ins or viewings of the data, etc. In one embodiment, this data is received from the user. In one embodiment, there is a system default setting, unless the user changes it to another value. In one embodiment, the system default value is "one log-in to view the data." Of course, alternative system defaults may be used.

At block 655, an access notification is sent to the recipient. In one embodiment, as noted above, a secure method of communication is established. In one embodiment, the secure method of communication may require the user to log into the server using SSL or a similar secure layer, and authenticate him/herself. The process then ends, at block 665.

Figure 7:
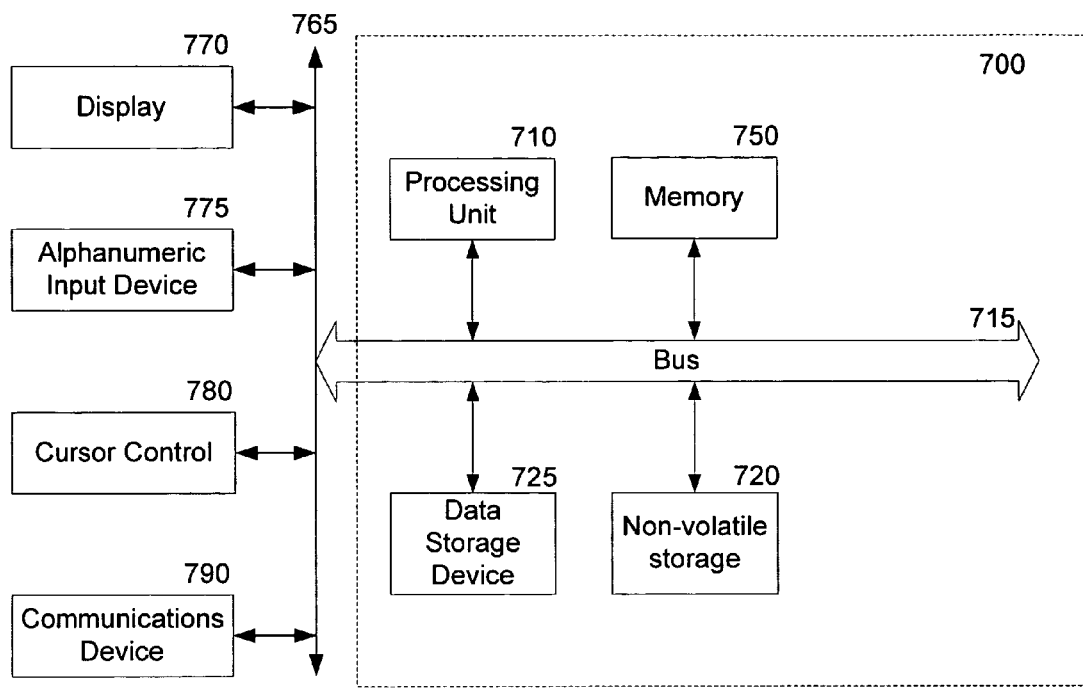
FIG. 7 is a block diagram of a computer system on which the software of the present invention may be implemented.

FIG. 7 is a block diagram of a computer system on which the software of the present invention may be implemented. It will be apparent to those of ordinary skill in the art, however that other alternative systems of various system architectures may also be used.

The data processing system illustrated in FIG. 7 includes a bus or other internal communication means 745 for communicating information, and a processor 740 coupled to the bus 745 for processing information. The system further comprises a random access memory (RAM) or other volatile storage device 750 (referred to as memory), coupled to bus 745 for storing information and instructions to be executed by processor 740. Main memory 750 also may be used for storing temporary variables or other intermediate information during execution of instructions by processor 740. The system also comprises a read only memory (ROM) and/or static storage device 720 coupled to bus 740 for storing static information and instructions for processor 740, and a data storage device 725 such as a magnetic disk or optical disk and its corresponding disk drive. Data storage device 725 is coupled to bus 745 for storing information and instructions.

The system may further be coupled to a display device 770, such as a cathode ray tube (CRT) or a liquid crystal display (LCD) coupled to bus 745 through bus 765 for displaying information to a computer user. An alphanumeric input device 775, including alphanumeric and other keys, may also be coupled to bus 745 through bus 765 for communicating information and command selections to processor 740. An additional user input device is cursor control device 780, such as a mouse, a trackball, stylus, or cursor direction keys coupled to bus 745 through bus 765 for communicating direction information and command selections to processor 740, and for controlling cursor movement on display device 770.

Another device, which may optionally be coupled to computer system 730, is a communication device 790 for accessing other nodes of a distributed system via a network. The communication device 790 may include any of a number of commercially available networking peripheral devices such as those used for coupling to an Ethernet, token ring, Internet, or wide area network. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 740. Other storage media may include floppy disks, memory cards, flash memory, or CD-ROM drives.

It will be apparent to those of ordinary skill in the art that the methods and processes described herein can be implemented as software stored in main memory 750 or read only memory 720 and executed by processor 740. This control logic or software may also be resident on an article of manufacture comprising a computer readable medium having computer readable program code embodied therein and being readable by the mass storage device 725 and for causing the processor 740 to operate in accordance with the methods and teachings herein.

The software of the present invention may also be embodied in a handheld or portable device containing a subset of the computer hardware components described above. For example, the handheld device may be configured to contain only the bus 745, the processor 740, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus to provide an always-on virtual monitor, alert, control, and share (MACS) device comprising:
   a communications component to establish an intermittent connection to a remote real sensor, monitor or device (SMD) and to receive intermittent updates from the SMD, the always-on virtual MACS device being a virtual representation of the SMD;
   a presentation layer to enable a user to interface with the always-on virtual MACS device, the always-on virtual MACS device providing historical and most current data regardless of a status of the real SMD;
   a control function to receive a command from the user and to control the SMD by sending the command to the SMD through the virtual MACS device, wherein if the SMD is not connected with the communications component when the command is received, the control function to store the command and to automatically send the command to the SMD once the intermittent connection is established; and
   an intelligent notification engine to enable automatic notification of recipients, wherein the intelligent notification engine associates a data security rating with a notification, and wherein how the intelligent notification engine sends the notification to the recipients is based on the security rating.

2. The apparatus of claim 1, further comprising:
   a historical database to store historical data from the SMD; and
   a data mining engine to retrieve the historical data and analyze the historical data.

3. The apparatus of claim 1, further comprising:
   user thresholds and alert rules to enable an authorized recipient to set alerts upon certain occurrences based on data received from the SMD.

4. The apparatus of claim 3, further comprising:
   a datamining engine to use the user thresholds and alert rules, and based on historical data from a historical database in addition to the data received in the intermittent update, determine if an alert is needed.

5. The apparatus of claim 4, further comprising:
   the datamining engine further to use data from other relevant SMDs, in calculating whether the alert is needed.

6. The apparatus of claim 1, wherein the virtual MACS device further comprises:
   a monitoring function enabling a user through the virtual MACS device to monitor data reliably from an intermittently connected actual device.

7. The apparatus of claim 1, wherein the virtual MACS device further comprises:
   an alert function enabling a user to set alerts and receive alerts.

8. The apparatus of claim 1, wherein the virtual MACS device further comprises:
   a share function enabling a user to add a new recipient to the list of recipients who receive access to the virtual MACS device, and to set a time out period after which the new recipient will lose the access to the virtual MACS device.

9. The apparatus of claim 8, wherein the share function comprises one of the following: setting an alert recipient, sending a one-time data set to a recipient, or setting access rights for a recipient.

10. The apparatus of claim 9, wherein the access rights include one or more of the following: monitoring the virtual MACS device, ability to edit and add or remove alerts from the virtual MACS device, controlling the SMD through the virtual MACS device, and ability to share access to the virtual MACS device.

11. The MACS device of claim 1, further comprising:
    the control function to determine whether the user is authorized to issue the received command, and to send the command to the SMD if the user is authorized to issue the received command.

12. The MACS device of claim 1, wherein the SMD is a doctor prescribed SMD that monitors one or more physical conditions of a patient, the MACS device further comprising:
    the control function to detect that the patient has changed a setting of the SMD; and
    an intelligent notification engine to notify the doctor that the patient has changed the setting.

13. A method to provide an always-on access to an intermittently connected sensor, monitor or device (SMD), wherein the SMD is a doctor prescribed medical SMD that monitors one or more physical conditions of a patient, the method comprising, at a server:
    intermittently establishing a connection to the SMD to receive intermittent updates from the SMD;
    adding the updates to a constantly maintained, always-on monitoring, accessing, controlling, and sharing (MACS) device maintained within the server;
    providing access to the MACS device, which is a virtual reflection of the SMD, and is always accessible with historical data and a most current available data;
    determining, based on an examination of the intermittent updates, whether the patient has changed a setting of the SMD; and
    upon determining that the patient has changed the setting of the SMD, notifying the doctor that the patient has changed the setting.

14. The method of claim 13, further comprising:
keeping a database of historical data from the SMD; and
analyzing the historical data.

15. The method of claim 13, further comprising:
enabling an administrator to add user thresholds and alert rules to set alerts upon certain occurrences based on data received from the SMD.

16. The method of claim 15, further comprising:
using historical data and current data with the user thresholds and alert rules to determine if an alert is needed.

17. The method of claim 16, further comprising:
requesting data from one or more other MACS devices maintained on the server; and
integrating the data from the other MACS devices in calculating whether the alert is needed.

18. A monitor, alert, control, and share (MACS) apparatus to provide a virtual representation of a real sensor, monitor or device (SMD) that has been prescribed by a doctor, the SMD being a medical SMD to monitor one or more physical conditions of a user, the apparatus comprising:

a communications component to establish an intermittent connection to the SMD to receive intermittent updates from the SMD, providing a most current data;

a presentation layer to enable a user to interface with the MACS device to obtain SMD data, the MACS device providing historical data and the most current data regardless of a status of the real SMD;

a control function to determine, based on an examination of the most current data, whether the user has changed a setting of the SMD; and an intelligent notification engine to notify the doctor that the user has changed the setting when the control function determines that the user has changed the setting of the SMD.

19. The MACS device of claim 18, further comprising:
user thresholds and alert rules to enable an authorized recipient to set alerts upon certain occurrences based on data received from the SMD.

* * * * *